Jan. 6, 1953 R. H. GODDARD 2,624,360
PROPORTIONATE FLOW CONTROL BY BALANCED MAGNETIC FORCE
Filed June 6, 1950

INVENTOR.
ROBERT H. GODDARD, DEC'D.
ESTHER C. GODDARD, EXECUTRIX.
BY
Chas. T. Hawley
ATT'Y.

Patented Jan. 6, 1953

2,624,360

UNITED STATES PATENT OFFICE 2,624,360

PROPORTIONATE FLOW CONTROL BY BALANCED MAGNETIC FORCE

Robert H. Goddard, deceased, late of Annapolis, Md., by Esther C. Goddard, executrix, Worcester, Mass., assignor of one-half to The Daniel and Florence Guggenheim Foundation, New York, N. Y., a corporation of New York Application June 6, 1950, Serial No. 166,513

5 Claims. (Cl. 137—100)

This invention relates to the maintenance of proportionate flow in two liquid supply pipes, such as the pipes supplying liquid fuel and a liquid oxidizer to a combustion chamber of the type used in rockets and rocket craft. Such combustion chambers commonly have an open and rearwardly-directed nozzle through which the combustion gases are discharged.

For effective combustion, it is essential that the relative proportion of the liquid fuel and the liquid oxidizer fed to such a chamber be maintained constant, regardless of changes in the actual amounts of fuel and oxidizer consumed.

It is the general object of this invention to provide improved and simplified apparatus for thus maintaining proportionate flow of two combustion liquids.

A further object is to provide apparatus for such purposes in which mechanical friction is substantially eliminated and in which magnetic transmission of flow-indications is utilized.

The apparatus is also so designed that it is not affected by simultaneous changes in the rates of flow of both of two liquids but is immediately responsive to changes in relative or proportionate flow.

The invention further relates to arrangements and combinations of parts which will be hereinafter described and more particularly pointed out in the appended claims.

Preferred forms of the invention are shown in the drawings, in which

Figure 1:
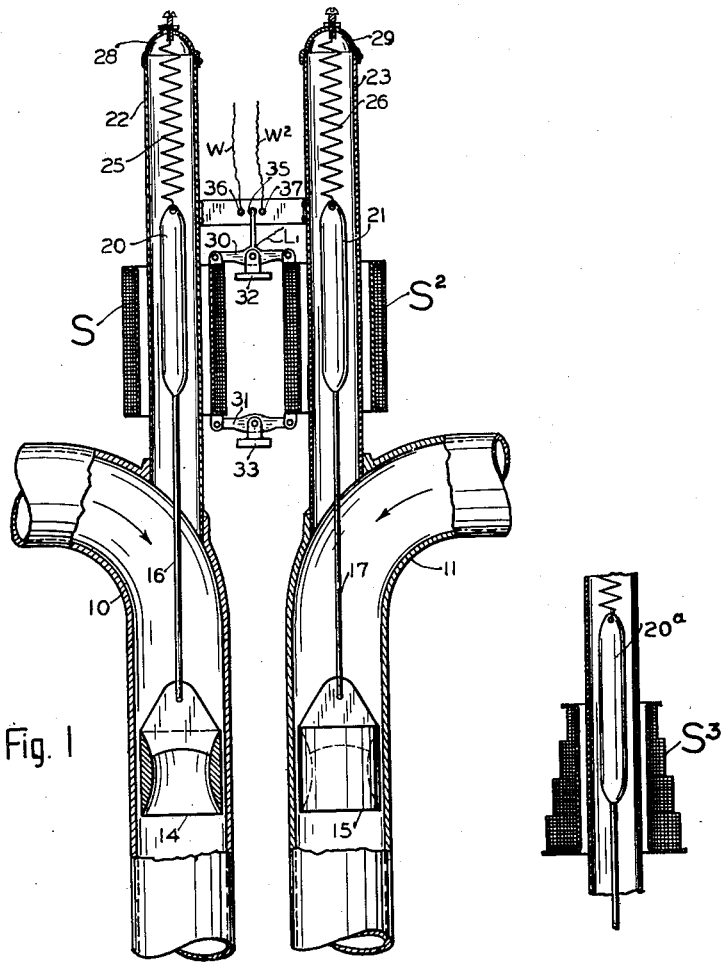
Fig. 1 is a sectional side elevation of control apparatus embodying this invention.

Referring to Fig. 1, associated feed pipes 10 and 11 are provided for two combustion liquids, such as gasoline and liquid oxygen. Deflectors 14 and 15 are loosely slidable in the pipes 10 and 11 and each have axial streamlined passages through which one of the combustion liquids flows.

The deflectors 14 and 15 are connected by rods 16 and 17 to soft iron bars 20 and 21 which are loosely mounted in tubular non-ferrous casings 22 and 23, which in turn are supported on and are in free communication with the feed pipes 10 and 11.

The tubes 22 and 23 also enclose springs 25 and 26 which are attached at their lower ends to the bars 20 and 21 and which are adjustably attached at their upper ends to casings 28 and 29 which close the upper ends of the tubes 22 and 23.

The bars 20 and 21 are thus pulled upward by the springs 25 and 26 and are simultaneously pulled downward by the action of the liquids flowing through the axial passages in the pipes 10 and 11 and in the deflectors 14 and 15.

Figure 2:
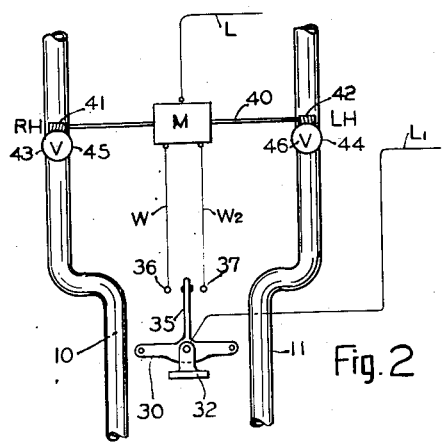
Fig. 2 is a diagrammatic view of certain valve-operating mechanism to be described.

Solenoids S and S2 surround the tubes 22 and 23 and are supported on rocking levers 30 and 31, pivoted on fixed bearings 32 and 33. The lever 30 has a contact arm 35 adapted to engage one or the other of two terminals 36 and 37 when displaced from mid-position. Wires W and W2 may be connected to opposite windings of a reversible motor M (Fig. 2), which in turn is connected to a line wire L. A second line wire L' is connected to the insulated contact arm 35 on the lever 30.

The armature shaft 40 of the motor M is connected to worms 41 and 42, which engage worm gears 43 and 44 associated with control valves 45 and 46. The worms 41 and 42 are right-hand and left-hand respectively, so that the valves 45 and 46 will be alternately opened and closed, any opening movement of one valve being associated with a corresponding closing movement of the other valve.

The operation of the described control apparatus is as follows:

When the flow through the pipes 10 and 11 is in the predetermined proportion, the bars 20 and 21 will be held at equal elevations and the solenoids S and S2 will be correspondingly equally elevated, with the contact arm 35 in mid-position. If the flow in both of the pipes 10 and 11 is increased or decreased but without change in proportion, both bars 20 and 21 will be moved upward or downward equally and the positions of the solenoids will remain unchanged.

If, however, the rate of flow in one of the pipes, as 10, is increased proportionately with respect to the flow in the other pipe, as 11, the bar 20 will be moved downward and the bar 21 will move upward. The solenoid S will then be moved downward and the solenoid S2 upward, thus rocking the supporting levers 30 and 31 and moving the contact arm 35 to engage the contact 36 and cause the motor M to give the valve 45 a closing movement and the valve 44 a corresponding opening movement. This will restore the proportionate flow.

As soon as the proportionate flow is restored, the solenoids S and S2 will return to their original positions and the arm 35 will be moved to mid position to break the motor circuit. If the increase in flow takes place in the second pipe 11, the same chain of events takes place, except that the valves 44 and 45 are oppositely shifted.

Figure 3:
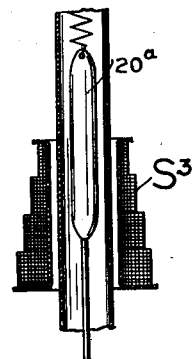
Fig. 3 is a sectional view showing a modified solenoid construction.

In Fig. 3, a solenoid S3 is shown which is wound in a series of steps, so that the further the iron bar, as 20a, is displaced, the stronger will be the reaction on the associated solenoid.

It will be noted that the transmission of flow-indication from the deflectors 14 and 15 to the solenoids S and S2 is magnetic only and involves no mechanical friction whatever, and it will also be noted that the rocking levers 30 and 31 have such extremely slight movement that the friction of the pivotal lever connections is negligible. An extremely sensitive and reliable apparatus for maintaining proportionate flow is thus made available.

Having thus described the invention and the advantages thereof, it will be understood that the invention is not to be limited to the details herein disclosed, otherwise than as set forth in the claims, but what is claimed is:

1. Apparatus for maintaining proportionate flow of liquids in two associated pipes which comprises a deflector mounted in each pipe and mounted for movements in the direction of flow, and proportionate to the rate of flow of the associated liquid, a spring to move each deflector in the opposite direction, an iron bar connected to move with each deflector, a solenoid surrounding each iron bar, each deflector, bar and spring being within a space filled with the liquid to be controlled and each solenoid being outside of said space, a single pivoted supporting structure for said two solenoids and which is displaceable by relative movement of said solenoids, said supporting structure being movable clockwise by the displacement of one solenoid on increased flow of the associated liquid and being movable anti-clockwise by the corresponding displacement of the other solenoid on increased flow of the other liquid and said displacements neutralizing each other when the flows of the two liquids are in the predetermined ratio, and means to vary the relative flow of said liquids in accordance with the displacement of said supporting structure.

2. The combination in apparatus for maintaining proportionate flow as set forth in claim 1, in which a reversible motor oppositely controls the flow in said two pipes, and in which displacement of said supporting structure in either direction causes said motor to rotate in a corresponding direction.

3. Apparatus for maintaining proportionate flow of liquids in two associated pipes which comprises a deflector mounted in each pipe and mounted for movements in the direction of flow, and proportionate to the rate of flow of the associated liquid, a spring to move each deflector in the opposite direction, flow-control apparatus for said two pipes and positioned outside of said pipes, and magnetic means to transmit an indication of axial displacement of a deflector to said flow-control apparatus, said magnetic means including a piece of magnetizable material movable with each deflector, electro-magnetic means associated with such magnetizable material and magnetically displaced by movement of said material, and means to operate said flow control apparatus to vary the relative flow in said two pipes in proportion to the relative displacement of said two pieces of magnetizable material.

4. The combination in apparatus for maintaining proportionate flow as set forth in claim 3, in which the indication of axial displacement is transmitted to said flow control apparatus by electrical means which includes spaced contacts and an interposed contact member movable in definite relation to changes in proportionate flow.

5. The combination in apparatus for maintaining proportionate flow as set forth in claim 1, in which each solenoid is wound with increasing turns toward that end of said solenoid which is more remote in the direction of flow of the associated liquid.

ESTHER C. GODDARD,
*Executrix of the Last Will and Testament of Robert H. Goddard, Deceased.*

REFERENCES CITED

The following references are of record in the file of this patent:

UNITED STATES PATENTS

| Number | Name | Date |
|---|---|---|
| 1,499,839 | Nicholson | July 1, 1924 |
| 1,961,350 | Grunsky | June 5, 1934 |
| 2,004,869 | Hogg | June 11, 1935 |
| 2,472,090 | Brewer | June 7, 1949 |
| 2,487,083 | Warshaw | Nov. 8, 1949 |
| 2,538,824 | Andresen | Jan. 23, 1951 |